US012723693B1

(12) United States Patent
Wong et al.

(10) Patent No.: US 12,723,693 B1
(45) Date of Patent: Sep. 1, 2026

(54) DOUBLE CONTAINMENT FITTINGS WITH FUSION COILS

(71) Applicant: K.D.W. Company Limited, Hong Kong (CN)

(72) Inventors: Kwok Din Wong, Shenzhen City (CN); Sai Hin Wong, Hong Kong (CN); Hang Yan Wong, Hong Kong (CN)

(73) Assignee: K.D.W. Company Limited, Hong Kong (CN)

( * ) Notice: Subject to any disclaimer, the term of this patent is extended or adjusted under 35 U.S.C. 154(b) by 0 days.

(21) Appl. No.: 19/188,400

(22) Filed: Apr. 24, 2025

(51) Int. Cl.
*F16L 47/03* (2006.01)
*F16L 39/00* (2006.01)

(52) U.S. Cl.
CPC ............ *F16L 47/03* (2013.01); *F16L 39/005* (2013.01)

(58) Field of Classification Search
CPC . F16L 53/38; F16L 13/02; F16L 25/10; F16L 47/03; F16L 39/005
See application file for complete search history.

(56) References Cited

U.S. PATENT DOCUMENTS 2,475,635 A 7/1949 Parsons
3,834,341 A 9/1974 Sexton et al.
4,786,088 A 11/1988 Ziu
4,886,305 A 12/1989 Martin
5,141,261 A 8/1992 Ziu
5,186,502 A 2/1993 Martin
5,252,157 A * 10/1993 Inhofe, Jr. ................ H05B 3/58 156/196
5,433,484 A * 7/1995 Ewen .................. B29C 66/5221 285/21.2
5,449,204 A 9/1995 Greene et al.
5,482,088 A 1/1996 Ziu
5,497,809 A 3/1996 Wolf
6,086,114 A * 7/2000 Ziu ....................... F16L 39/005 285/123.17
11,131,414 B2 * 9/2021 Genoni ................. B29C 66/112
11,982,389 B2 5/2024 Wong et al.
2021/0102652 A1 4/2021 Yamamoto et al.
2023/0175624 A1 * 6/2023 Breyer .............. B29C 66/72523

FOREIGN PATENT DOCUMENTS

CN 107366792 A * 11/2017 .............. F16L 59/22
EP 3051198 A1 8/2016
EP 3217060 A1 9/2017
JP 2021-58915 A 4/2021
WO 92/17725 A1 10/1992
WO 2011/073770 A1 6/2011
WO 2012/070946 A1 5/2012

OTHER PUBLICATIONS

Prior art industry practice on PE, PP, etc Pipe and Fittings (3 pages).
U.S. Appl. No. 19/536,679.

* cited by examiner

*Primary Examiner* — James M Hewitt, II
(74) *Attorney, Agent, or Firm* — FLYNN THIEL, P.C.

(57) ABSTRACT

A double containment fitting for engagement with double containment pipes and comprising an outer cylinder, an inner cylinder and a plurality of ribs spacing the outer cylinder from the inner cylinder. The double containment fitting further includes heatable elements configured to have energy supplied thereto to heat the heatable elements to fuse the double containment fitting to the double containment pipes.

16 Claims, 6 Drawing Sheets

DOUBLE CONTAINMENT FITTINGS WITH FUSION COILS

FIELD OF THE INVENTION

This disclosure relates generally to the field of tubing, and in particular for double containment fittings for connecting double containment tubing using fusion coils.

BACKGROUND OF THE INVENTION

Double containment piping systems comprise double containment pipes having an inner tube surrounded by an outer tube. Spacers space the inner tube from the outer tube. The inner tube is configured to have a fluid flow therethrough. The outer tube is configured to contain fluid within the piping system in case fluid escapes from the inner tube. Double containment piping systems can be used to protect against leaks of corrosive or hazardous fluids from the inner tube.

Conventional double containment fittings for the double containment piping system are connected to ends of the double containment pipes. The double containment fittings provide for a longer piping system and/or for the piping system to have bends and/or splits in fluid flows. The double containment fittings are made of assemblies of several separate pieces which can allow for fluid to leak from the fittings at the intersection of the several separate pieces of the fittings and/or when the several separate pieces of the fittings become loose.

Safer and more stable double containment fittings are desired.

SUMMARY OF THE INVENTION

The present invention, according to one aspect, is directed to a double containment fitting assembly comprising a plurality of double containment pipes and a double containment fitting. Each of the plurality of double containment pipes has an inner tube surrounded by an outer tube and a plurality of spacers spacing the inner tube from the outer tube. Each of the plurality of double containment pipes has an inner flow path within the inner tube and an outer flow path located between the inner tube and the outer tube. The double containment fitting is connected to the plurality of double containment pipes. The double containment fitting comprises an outer cylinder having two outer receiving openings, an inner cylinder having two inner receiving openings, and a plurality of ribs integral with and spacing the outer cylinder from the inner cylinder, thereby forming an inner fitting flow area within the inner cylinder and forming an outer fitting flow area between the outer cylinder and the inner cylinder and between adjacent ribs. Each inner tube of the plurality of double containment pipes is connected to the double containment fitting being located within one of the inner receiving openings of the inner cylinder of the double containment fitting. Each outer tube of the plurality of double containment pipes is connected to the double containment fitting being located within one of the outer receiving openings. A first fluid flow path is located in the inner flow path and the inner fitting flow area of the double containment fitting assembly such that fluid is configured to flow through the first fluid flow path without leaking from the first fluid flow path. A second fluid flow path is located in the outer flow path and the outer fitting flow area of the double containment tubing assembly such that fluid is configured to flow through the second fluid flow path if a leakage occurs from the first fluid flow path. The double containment fitting further includes a first heatable element configured to be located between the outer cylinder of the double containment fitting and the outer tubes of the double containment pipes, with the first heatable element having at least one first end exposed to an exterior of the double containment fitting. The at least one first end is configured to have energy supplied thereto to heat the first heatable element to fuse the outer cylinder of the double containment fitting to the outer tubes of the double containment pipes. The double containment fitting further includes a second heatable element configured to be located between the inner cylinder of the double containment fitting and the inner tubes of the double containment pipes, with the second heatable element having at least one second end exposed to the exterior of the double containment fitting. The at least one second end is configured to have energy supplied thereto to heat the second heatable element to fuse the inner cylinder of the double containment fitting to the inner tubes of the double containment pipes.

Yet another aspect of the present invention is to provide a double containment fitting for engagement with a plurality of double containment pipes each having an inner tube surrounded by an outer tube and a plurality of spacers spacing the inner tube from the outer tube. The double containment fitting comprises an outer cylinder having two outer receiving openings, an inner cylinder having two inner receiving openings, and a plurality of ribs integral with and spacing the outer cylinder from the inner cylinder, thereby forming an inner fitting flow area within the inner cylinder and forming an outer fitting flow area between the outer cylinder and the inner cylinder and between adjacent ribs. Each inner tube of the plurality of double containment pipes is configured to be connected to the double containment fitting by being located within one of the inner receiving openings of the inner cylinder of the double containment fitting. Each outer tube of the plurality of double containment pipes is configured to be connected to the double containment fitting by being located within one of the outer receiving openings. The double containment fitting further includes a first heatable element configured to be located between the outer cylinder of the double containment fitting and the outer tubes of the double containment pipes, with the first heatable element having at least one first end exposed to an exterior of the double containment fitting. The at least one first end is configured to have energy supplied thereto to heat the first heatable element to fuse the outer cylinder of the double containment fitting to the outer tubes of the double containment pipes. The double containment fitting further includes a second heatable element configured to be located between the inner cylinder of the double containment fitting and the inner tubes of the double containment pipes, with the second heatable element having at least one second end exposed to the exterior of the double containment fitting. The at least one second end is configured to have energy supplied thereto to heat the second heatable element to fuse the inner cylinder of the double containment fitting to the inner tubes of the double containment pipes.

BRIEF DESCRIPTION OF THE DRAWINGS

One or more embodiments of the present invention are illustrated by way of example and should not be construed as being limited to the specific embodiments depicted in the accompanying drawings, in which like reference numerals indicate similar elements.

Certain terminology will be used in the following description for convenience in reference only and will not be limiting. Said terminology will include the words specifically mentioned, derivatives thereof, and words of similar import.

DETAILED DESCRIPTION

Reference will now be made in detail to implementations and embodiments of various aspects and variations of the invention, examples of which are illustrated in the accompanying drawings. Although at least two variations of the systems, methods and uses are described, other variations of the systems, methods and uses may include aspects of the systems, methods and uses described herein combined in any suitable manner having combinations of all or some of the aspects described.

Figure 1:
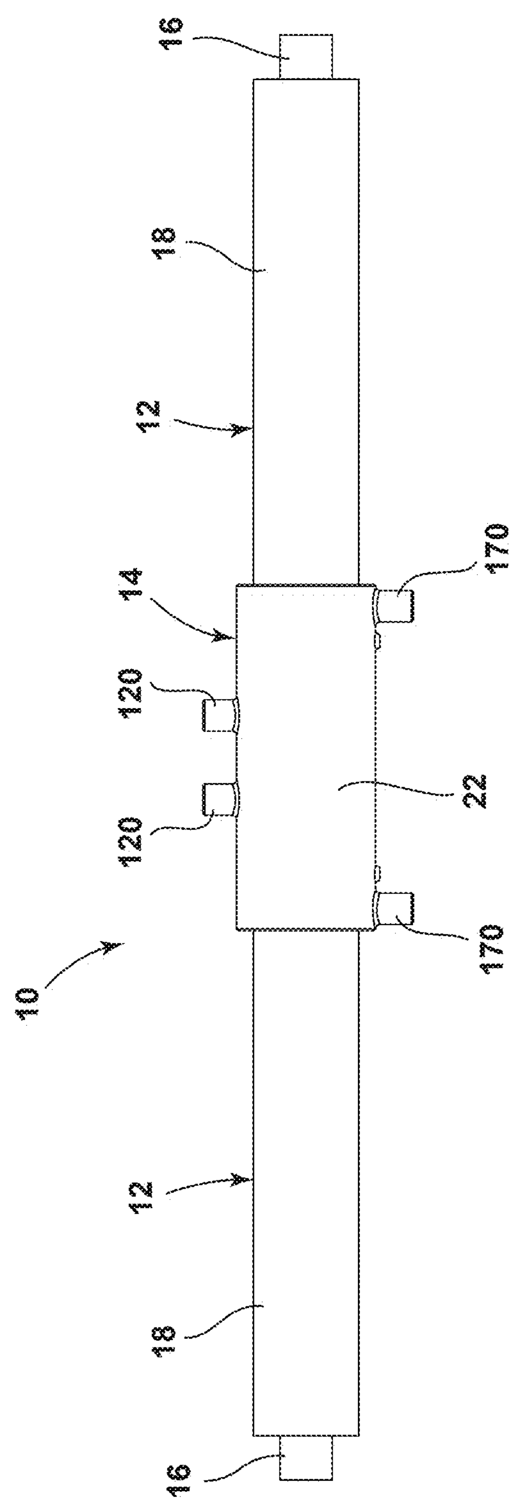
FIG. 1 is a side view of a double containment piping system employing a double containment fitting according to an embodiment of the present invention.
Figure 2:
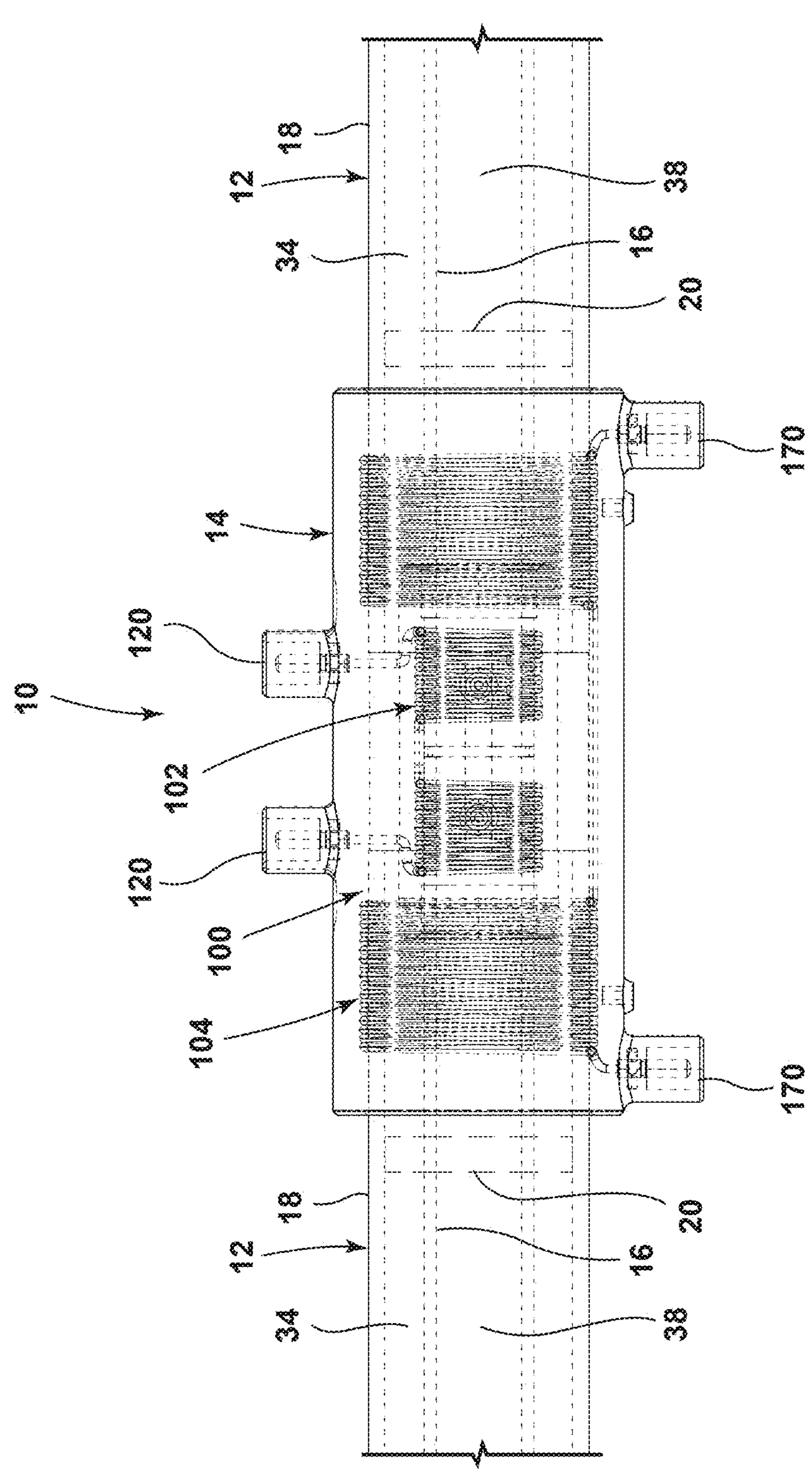
FIG. 2 is a side view of the double containment piping system employing the double containment fitting according to an embodiment of the present invention, with transparent elements.

FIGS. 1-2 illustrate embodiments of a double containment tubing assembly 10. The double containment tubing assembly 10 includes prior art double containment pipes 12 connected to each other by a double containment fitting 14 of the present invention. The double containment pipes 12 each include an inner tube 16 and an outer tube 18 separated from each other by spacers 20 (see FIG. 2) that are integral with the inner tube 16 and the outer tube 18. Other prior art double containment pipes 12 can include spacers 20 between the inner tube 16 and the outer tube 18 that are positioned in an interference fit to maintain the inner tube 16 in position within the outer tube 18. Such prior art double containment pipes 12 are well known to those skilled in the art.

Figure 3:
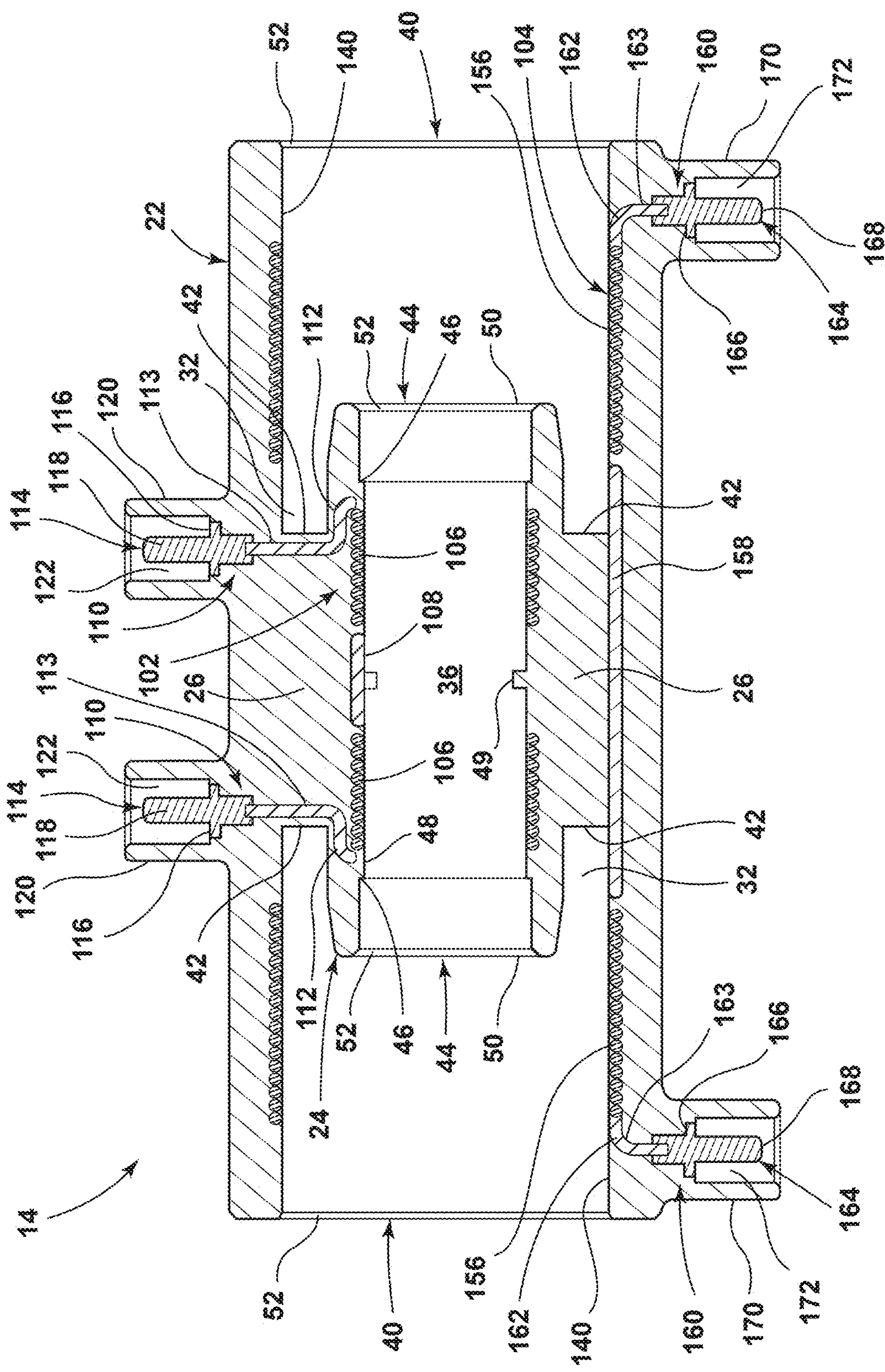
FIG. 3 is a cross-section view of the double containment fitting according to the present invention.
Figure 4:
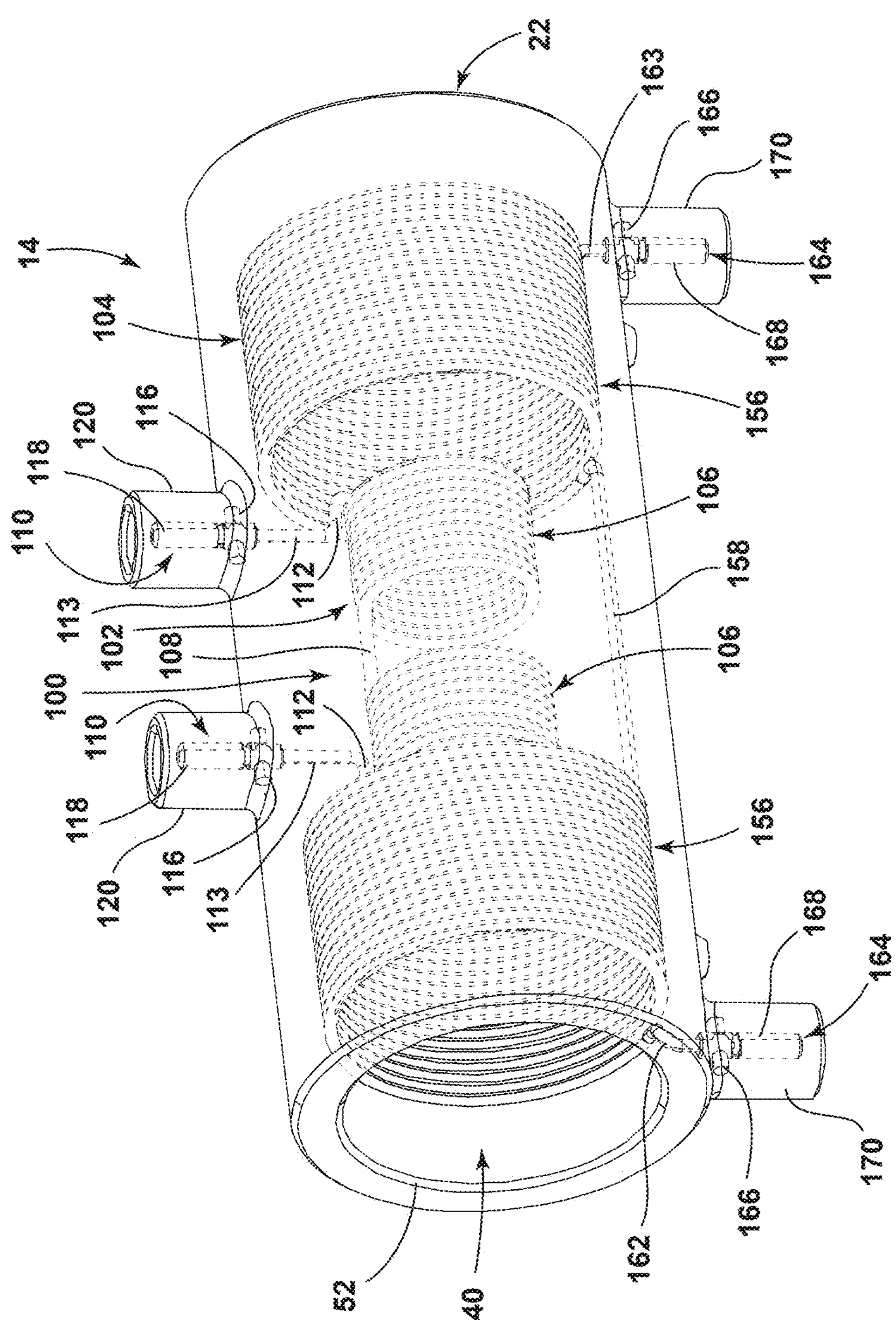
FIG. 4 is a perspective view of the double containment fitting according to the present invention.
Figure 5:
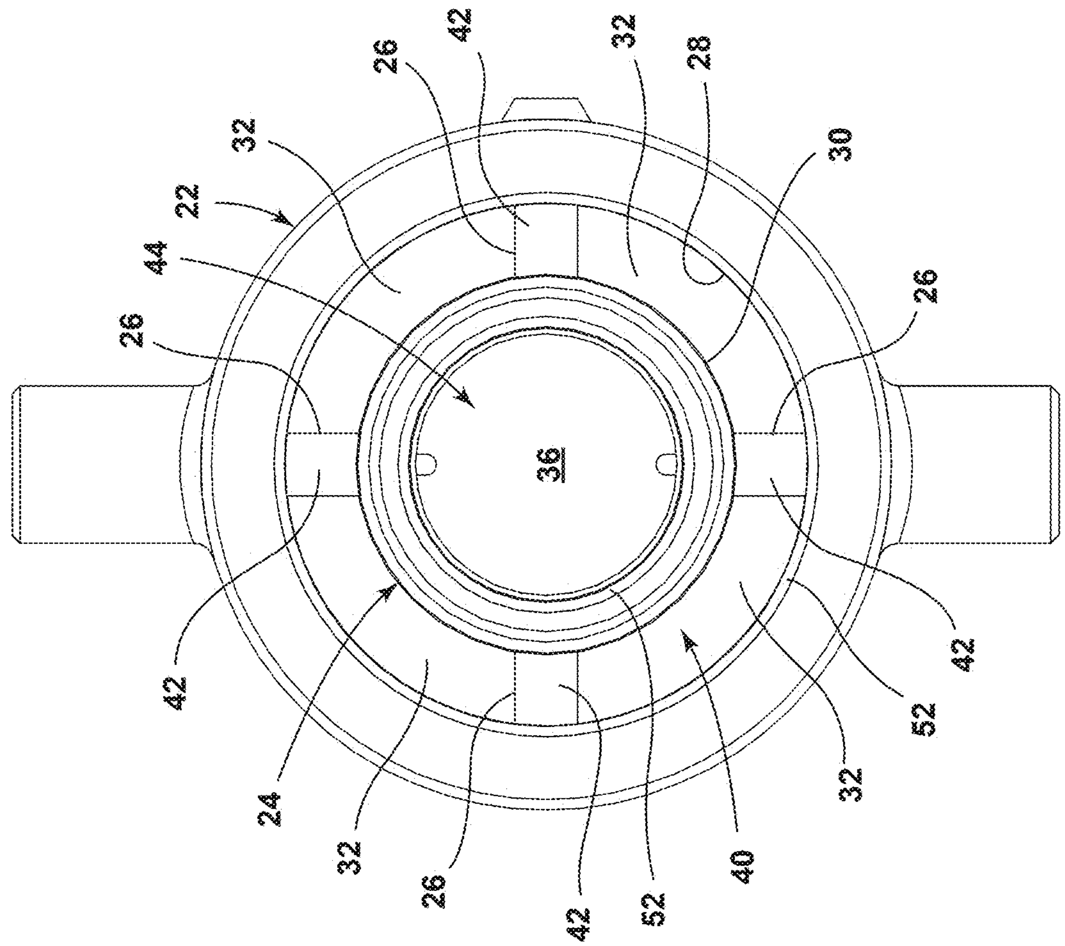
FIG. 5 is an end view of the double containment fitting according to the present invention.

FIGS. 3-5 illustrate the double containment fitting 14 of the present invention. The double containment fitting 14 includes an outer cylinder 22 and an inner cylinder 24 spaced from each other and connected to each other by a plurality of longitudinally extending ribs 26. The longitudinally extending ribs 26 are formed integral with an inner surface 28 of the outer cylinder 22 and with an outer surface 30 of the inner cylinder 24. As shown in FIG. 5, the double containment fitting 14 can include four equally spaced longitudinally extending ribs 26 that define outer passages 32 between each of the longitudinally extending ribs 26. The outer passages 32 fluidly connect the interior outer spaces 34 of the outer tubes 18 of the double containment pipes 12 connected to the double containment fitting 14, wherein the interior outer spaces 34 are located between the outer tubes 18 and the inner tubes 16 of the double containment pipes 12. An inner passage 36 within the inner cylinder 24 of the double containment fitting 14 fluidly connects interior inner spaces 38 of the inner tubes 16 of the double containment pipes 12 connected to the double containment fitting 14, wherein the interior inner spaces 38 are located within the inner tubes 16 of the double containment pipes 12.

The illustrated outer cylinder 22 of the double containment fitting 14 forms a pair of outer receiving openings 40 for receiving the outer tubes 18 of the double containment pipes 12. A pair of opposite stops 42 are located on opposite ends of the ribs 26 that act as abutments for the outer tubes 18 of the double containment pipes 12 as the double containment pipes 12 are inserted into the double containment fitting 14. Likewise, the illustrated inner cylinder 24 forms a pair of inner receiving openings 44 for receiving the inner tubes 16 of the double containment pipes 12. A circular inner ledge 46 is formed on an inner surface 48 of the inner cylinder 24 adjacent an entrance 50 into the inner receiving openings 44. A center abutment rib 49 is located in the center of the inner cylinder 24, with the center abutment rib 49 acting as abutments for the inner tubes 16 of the double containment pipes 12 as the double containment pipes 12 are inserted into the double containment fitting 14. It is contemplated that the center abutment rib 49 could form a closed circle or have one or more interruptions. The outer receiving openings 40 and the inner receiving openings 44 can have beveled outer edges 52 for easy insertion of the outer tubes 18 and the inner tubes 16 therein, respectively.

The present invention is drawn to a system for securely connecting the double containment fitting 14 of the present invention to the double containment pipes 12. While an interference fit or adhesive might be acceptable for connecting prior art double containment pipes to a prior art double containment fitting when the prior art double containment pipes and the prior art double containment fitting are made of unplasticized polyvinyl chloride (UPVC), a secure manner of connecting double containment pipes and double containment fitting made of other materials to each other is desired. The present invention is drawn to connecting the double containment fitting 14 to double containment pipes of materials that are more difficult to make. For example, an aspect of the present invention can be employed when the double containment fitting 14 of the present invention and the double containment pipes 12 are formed of polyethylene (PE) or polypropylene (PP).

In the illustrated example, the double containment fitting 14 of the present invention includes a fusion coil assembly 100 including an inner fusion coil 102 and an outer fusion coil 104. The inner fusion coil 102 is energized to fuse the inner tube 16 of the double containment pipes 12 to the inner cylinder 24 of the double containment fitting 14 and the outer fusion coil 104 is energized to fuse the outer tube 18 of the double containment pipes 12 to the outer cylinder 22 of the double containment fitting 14.

Figures 6, 7:
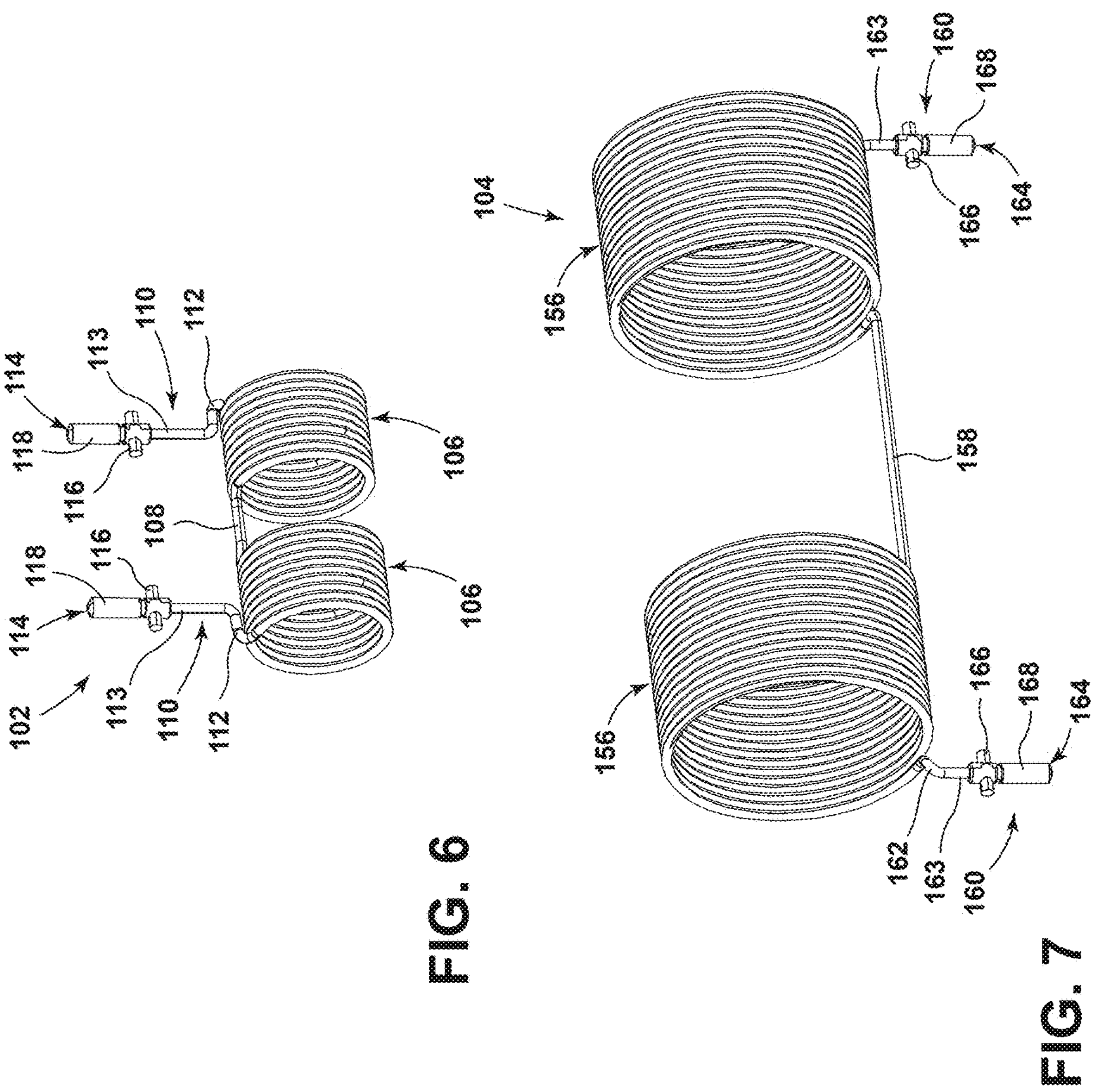
FIG. 6 is a perspective view of an inner fusion coil of the double containment fitting according to the present invention.
FIG. 7 is a perspective view of an outer fusion coil of the double containment fitting according to the present invention.

The illustrated inner fusion coil 102 (FIG. 6) is contained with the double containment fitting 14. The inner fusion coil 102 comprises a fusion wire that is bent to form the illustrated inner fusion coil 102. In the illustrated example, the fusion wire is bent to form a pair of connection fusion spirals 106 forming a pair of fusion cylindrical structures that are connected by a straight inner connection portion 108 of the fusion wire. Opposite ends 110 of the fusion wire extend outward from ends of each of the pair of connection fusion spirals 106. While both ends 110 are illustrated as including a bent portion 112 directly adjacent the connection fusion spirals 106 and an upward portion 113 extending upward in a parallel direction and substantially perpendicular to the inner connection portion 108, it is contemplated that the ends 110 could extend in any direction that leads to an exterior of the double containment fitting 14. In the illustrated example, each of the ends 110 of the inner fusion coil 102 includes inner coil terminals 114 configured to be connected to an energy source. The inner coil terminals 114 have a prong 116 (which could also be in the form of a disc) and a connector terminal 118 for connection to the energy source.

In the illustrated example, the inner fusion coil 102 is housed within the double containment fitting 14. As shown in FIGS. 2 and 3, the inner fusion coil 102 is housed within the double containment fitting 14 with the connection fusion spirals 106 located at the inner surface 48 of the inner cylinder 24 between the circular inner ledge 46 and the center abutment rib 49 such that the inner diameter of the connection fusion spirals 106 is the same as the inner diameter of the inner cylinder 24 (and the outer diameter of the inner tube 16 of the double containment pipes 12). The straight inner connection portion 108 connects the pair of connection fusion spirals 106 in the inner cylinder 24 under the center abutment rib 49 as shown in FIG. 3. The bent portion 112 and the upward portion 113 are located within the double containment fitting 14. The ends 110 of the inner fusion coil 102 extend out of the double containment fitting 14, with the inner coil terminals 114 being surrounded by circular shells 120 extending outwardly from the double containment fitting 14. The prong 116 is at a bottom of the circular shells 120 to keep the ends 110 in position within the double containment fitting 14. An open area 122 is located between an inner surface of the circular shells 120 and an outer surface of the connector terminal 118 to allow for a connector of the energy device to be positioned on the connector terminal 118 to supply energy to the inner fusion coil 102.

The illustrated outer fusion coil 104 (FIG. 7) is contained with the double containment fitting 14. The outer fusion coil 104 comprises a fusion wire that is bent to form the illustrated outer fusion coil 104. In the illustrated example, the fusion wire is bent to form a pair of connection fusion spirals 156 forming a pair of fusion cylindrical structures that are connected by a straight outer connection portion 158 of the fusion wire. Opposite ends 160 of the fusion wire extend outward from ends of each of the pair of connection fusion spirals 156. While both ends 160 are illustrated as including a bent portion 162 directly adjacent the connection fusion spirals 156 and a downward portion 163 extending upward in a parallel direction and substantially perpendicular to the outer connection portion 158, it is contemplated that the ends 160 could extend in any direction that leads to an exterior of the double containment fitting 14. In the illustrated example, each of the ends 160 of the outer fusion coil 104 includes outer coil terminals 164 configured to be connected to an energy source. The outer coil terminals 164 have a prong 166 (which could also be in the form of a disc) and a connector terminal 168 for connection to the energy source.

In the illustrated example, the outer fusion coil 104 is housed within the double containment fitting 14. As shown in FIGS. 2 and 3, the outer fusion coil 104 is housed within the double containment fitting 14 with the connection fusion spirals 156 located at an inner surface 140 of the outer cylinder 22 between the entrance 50 to the outer cylinder 22 and the ribs 26 such that the inner diameter of the connection fusion spirals 156 is the same as the inner diameter of the outer cylinder 22 (and the outer diameter of the outer tube 18 of the double containment pipes 12). The straight outer connection portion 158 connects the pair of connection fusion spirals 156 in the outer cylinder 22 under the ribs 26 as shown in FIG. 3. The bent portion 162 and the downward portion 163 are located within the double containment fitting 14. The ends 160 of the outer fusion coil 104 extend out of the double containment fitting 14, with the outer coil terminals 164 being surrounded by circular shells 170 extending outwardly from the double containment fitting 14. The prong 166 is at a bottom the circular shells 170 to keep the ends 160 in position within the double containment fitting 14. An open area 172 is located between an inner surface of the circular shells 170 and an outer surface of the connector terminal 168 to allow for a connector of the energy device to be positioned on the connector terminal 168 to supply energy to the outer fusion coil 104.

In use of the double containment fitting 14 of the present invention, the double containment pipes 12 (or only one double containment pipe 12) is inserted into the double containment fitting 14. An energy supply device is then connected to the inner coil terminals 114 and the outer coil terminals 164 to supply energy to the inner fusion coil 102 and the outer fusion coil 104, respectively. This energy will cause the inner tube 16 and the outer tube 18 of the double containment pipes 12 to fuse to the inner cylinder 24 and outer cylinder 22 of the double containment fitting 14 to securely connect the double containment pipes 12 to the double containment fitting 14 fluidly in a secure manner.

Although particular preferred embodiments of the invention have been disclosed in detail for illustrative purposes, other embodiments are envisioned. For example, it is contemplated that the double containment fitting 14 could be a T-shaped double containment fitting, a 90° elbow double containment fitting, or a 45° elbow double containment fitting, with a fusion coil located at each inner surface of the cylinder holding the double containment pipe connected thereto. It will be recognized that variations or modifications of the disclosed apparatus, including the rearrangement of parts, lie within the scope of the present invention.

What is claimed is:

1. A double containment fitting for engagement with a plurality of double containment pipes each having an inner tube surrounded by an outer tube and a plurality of spacers spacing the inner tube from the outer tube, the double containment fitting comprising:

an outer cylinder having two outer receiving openings;

an inner cylinder having two inner receiving openings; and a plurality of ribs integral with and spacing the outer cylinder from the inner cylinder, thereby forming an inner fitting flow area within the inner cylinder and forming an outer fitting flow area between the outer cylinder and the inner cylinder and between adjacent ribs;

wherein each inner tube of the plurality of double containment pipes being configured to be connected to the double containment fitting by being located within one of the inner receiving openings of the inner cylinder of the double containment fitting;

wherein each outer tube of the plurality of double containment pipes configured to be connected to the double containment fitting by being located within one of the outer receiving openings;

the double containment fitting further including a first heatable element configured to be located between the outer cylinder of the double containment fitting and the outer tubes of the double containment pipes, the first heatable element having at least one first end exposed to an exterior of the double containment fitting, the at least one first end configured to have energy supplied thereto to heat the first heatable element to fuse the outer cylinder of the double containment fitting to the outer tubes of the double containment pipes; and the double containment fitting further including a second heatable element configured to be located between the inner cylinder of the double containment fitting and the inner tubes of the double containment pipes, the second heatable element having at least one second end exposed to the exterior of the double containment fitting, the at least one second end configured to have energy supplied thereto to heat the second heatable element to fuse the inner cylinder of the double containment fitting to the inner tubes of the double containment pipes;

wherein the first heatable element and the second heatable element are electrically separated;

wherein the first heatable element includes a pair of first exposed leads that extend through the outer cylinder and that are exposed to an exterior of the outer cylinder;

wherein the second heatable element includes a pair of second exposed leads that extend through the outer cylinder and that are exposed to an exterior of the outer cylinder; and wherein a first distance between the pair of first exposed leads is smaller than a distance between the pair of second exposed leads.

2. The double containment fitting of claim 1, wherein:

the outer cylinder consists of a single outer cylinder; and the inner cylinder consists of a single inner cylinder.

3. The double containment fitting of claim 2, wherein:

the plurality of double containment pipes are straight.

4. The double containment fitting of claim 3, wherein:

the double containment fitting is formed as a one-piece integral structure.

5. The double containment fitting of claim 3, wherein:

the first heatable element comprises a pair of outer coils connected together, each of the outer coils configured to surround one of the outer tubes of one of the double containment pipes; and the second heatable element comprises a pair of inner coils connected together, each of the inner coils configured to surround one of the inner tubes of one of the double containment pipes.

6. The double containment fitting of claim 5, wherein:

the at least one first end of the first heatable element comprises a pair of first ends connected to each other via the pair of outer coils, the pair of first ends configured to have a power source connected thereto to supply energy to the first heatable element; and the at least one second end of the second heatable element comprises a pair of second ends connected to each other via the pair of inner coils, the pair of second ends configured to have a power source connected thereto to supply energy to the second heatable element.

7. The double containment fitting of claim 3, wherein:

the plurality of double containment pipes are formed of polyethylene (PE) or polypropylene (PP).

8. The double containment fitting of claim 1, wherein:

the pair of first exposed leads and the pair of second exposed leads are on opposite sides of the outer cylinder.

9. A double containment fitting assembly comprising:

a plurality of double containment pipes, each of the plurality of double containment pipes having an inner tube surrounded by an outer tube and a plurality of spacers spacing the inner tube from the outer tube, each of the plurality of double containment pipes having an inner flow path within the inner tube and an outer flow path located between the inner tube and the outer tube; and a double containment fitting, the double containment fitting being connected to the plurality of double containment pipes;

the double containment fitting comprising:

an outer cylinder having two outer receiving openings;

an inner cylinder having two inner receiving openings; and a plurality of ribs integral with and spacing the outer cylinder from the inner cylinder, thereby forming an inner fitting flow area within the inner cylinder and forming an outer fitting flow area between the outer cylinder and the inner cylinder and between adjacent ribs;

wherein each inner tube of the plurality of double containment pipes is connected to the double containment fitting being located within one of the inner receiving openings of the inner cylinder of the double containment fitting;

wherein each outer tube of the plurality of double containment pipes is connected to the double containment fitting being located within one of the outer receiving openings;

wherein a first fluid flow path is located in the inner flow path and the inner fitting flow area of the double containment fitting assembly such that fluid is configured to flow through the first fluid flow path without leaking from the first fluid flow path; and wherein a second fluid flow path is located in the outer flow path and the outer fitting flow area of the double containment tubing assembly such that fluid is configured to flow through the second fluid flow path if a leakage occurs from the first fluid flow path;

the double containment fitting further including a first heatable element configured to be located between the outer cylinder of the double containment fitting and the outer tubes of the double containment pipes, the first heatable element having at least one first end exposed to an exterior of the double containment fitting, the at least one first end configured to have energy supplied thereto to heat the first heatable element to fuse the outer cylinder of the double containment fitting to the outer tubes of the double containment pipes; and the double containment fitting further including a second heatable element configured to be located between the inner cylinder of the double containment fitting and the inner tubes of the double containment pipes, the second heatable element having at least one second end exposed to the exterior of the double containment fitting, the at least one second end configured to have energy supplied thereto to heat the second heatable element to fuse the inner cylinder of the double containment fitting to the inner tubes of the double containment pipes;

wherein the first heatable element and the second heatable element are electrically separated;

wherein the first heatable element includes a pair of first exposed leads that extend through the outer cylinder and that are exposed to an exterior of the outer cylinder;

wherein the second heatable element includes a pair of second exposed leads that extend through the outer cylinder and that are exposed to an exterior of the outer cylinder; and wherein a first distance between the pair of first exposed leads is smaller than a distance between the pair of second exposed leads.

10. The double containment fitting assembly of claim 9, wherein:

the outer cylinder consists of a single outer cylinder; and the inner cylinder consists of a single inner cylinder.

11. The double containment fitting assembly of claim 9, wherein:

the plurality of double containment pipes are straight.

12. The double containment fitting assembly of claim 9, wherein:

the double containment fitting is formed as a one-piece integral structure.

13. The double containment fitting assembly of claim 9, wherein:

the first heatable element comprises a pair of outer coils connected together, each of the outer coils configured to surround one of the outer tubes of one of the double containment pipes; and the second heatable element comprises a pair of inner coils connected together, each of the inner coils configured to surround one of the inner tubes of one of the double containment pipes.

14. The double containment fitting assembly of claim 13, wherein:

the at least one first end of the first heatable element comprises a pair of first ends connected to each other via the pair of outer coils, the pair of first ends configured to have a power source connected thereto to supply energy to the first heatable element; and the at least one second end of the second heatable element comprises a pair of second ends connected to each other via the pair of inner coils, the pair of second ends configured to have a power source connected thereto to supply energy to the second heatable element.

15. The double containment fitting assembly of claim 9, wherein:

the plurality of double containment pipes are formed of polyethylene (PE) or polypropylene (PP).

16. The double containment fitting assembly of claim 9, wherein:

the pair of first exposed leads and the pair of second exposed leads are on opposite sides of the outer cylinder.

* * * * *